(12) United States Patent
Jansen et al.

(10) Patent No.: US 10,359,239 B1
(45) Date of Patent: Jul. 23, 2019

(54) HEAT EXCHANGE MEMBER AND HEAT EXCHANGERS UTILIZING THE HEAT EXCHANGE MEMBER

(71) Applicant: Lockheed Martin Corporation, Bethesda, MD (US)

(72) Inventors: Eugene Charles Jansen, Stafford, VA (US); Derek Matthew Beckner, Manassas Park, VA (US); Scott Morris Maurer, Haymarket, VA (US); Kevin Patrick Miller, Fairfax, VA (US); Nicholas J. Nagurny, Manassas, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 559 days.

(21) Appl. No.: 14/992,451

(22) Filed: Jan. 11, 2016

Related U.S. Application Data

(60) Provisional application No. 62/101,525, filed on Jan. 9, 2015.

(51) Int. Cl.
 *B23P 15/26* (2006.01)
 *F28F 11/00* (2006.01)

(52) U.S. Cl.
 CPC ............ *F28F 11/00* (2013.01); *B23P 15/26* (2013.01)

(58) Field of Classification Search
 CPC .. F28F 1/022; F28F 1/025; F28F 1/422; F28F 2220/00; F28F 2275/062; F28F 9/0239; F28F 9/0241; F28D 1/022; F28D 1/0476
 USPC ....... 165/153, 173–176, DIG. 054, DIG. 058
 See application file for complete search history.

(56) References Cited

U.S. PATENT DOCUMENTS

| | | | | |
|---|---|---|---|---|
| 5,036,909 A | * | 8/1991 | Whitehead | F28D 1/0391 165/133 |
| 5,318,114 A | * | 6/1994 | Sasaki | F28D 1/035 165/109.1 |
| 5,704,415 A | * | 1/1998 | Suzuki | F28D 15/0233 165/104.21 |
| 5,758,720 A | * | 6/1998 | Moser | F28D 1/05366 165/148 |

(Continued)

FOREIGN PATENT DOCUMENTS

DE        10051070 A1  *  4/2002    ............ B21D 53/08

OTHER PUBLICATIONS

DE 10051070 A1—English Machine Translation.*

*Primary Examiner* — Jianying C Atkisson
*Assistant Examiner* — Jose O Class-Quinones
(74) *Attorney, Agent, or Firm* — Withrow & Terranova, PLLC

(57) ABSTRACT

A heat exchanger is disclosed. The heat exchanger includes a heat exchange member that includes a first extruded member having a first end and a second end. The first extruded member forms a plurality of fluid passages that are in fluid communication with the first end of the first extruded member and the second end of the first extruded member. At least one of the fluid passages is an inlet fluid passage and at least one of the fluid passages is an outlet fluid passage. A plug is fixedly coupled to the second end of the first extruded member. The plug forms a plug fluid passage that fluidically interconnects the inlet fluid passage at the second end of the first extruded member with the outlet fluid passage at the second end of the first extruded member.

21 Claims, 17 Drawing Sheets

(56) References Cited

U.S. PATENT DOCUMENTS

| | | | |
|---|---|---|---|
| 6,302,196 B1* | 10/2001 | Haussmann | B21D 53/04 |
| | | | 165/153 |
| 6,637,109 B2* | 10/2003 | Nyqvist | B23K 20/1265 |
| | | | 228/183 |
| 2008/0264611 A1* | 10/2008 | Chang | H01L 21/4882 |
| | | | 165/104.26 |
| 2009/0159643 A1 | 6/2009 | Wimmer et al. | |
| 2009/0321060 A1* | 12/2009 | Chou | F28F 1/022 |
| | | | 165/185 |
| 2012/0199334 A1 | 8/2012 | Maurer et al. | |
| 2014/0217190 A1* | 8/2014 | Peterle | F28D 1/0226 |
| | | | 237/74 |

\* cited by examiner

HEATING ZONE

VAPORIZING ZONE

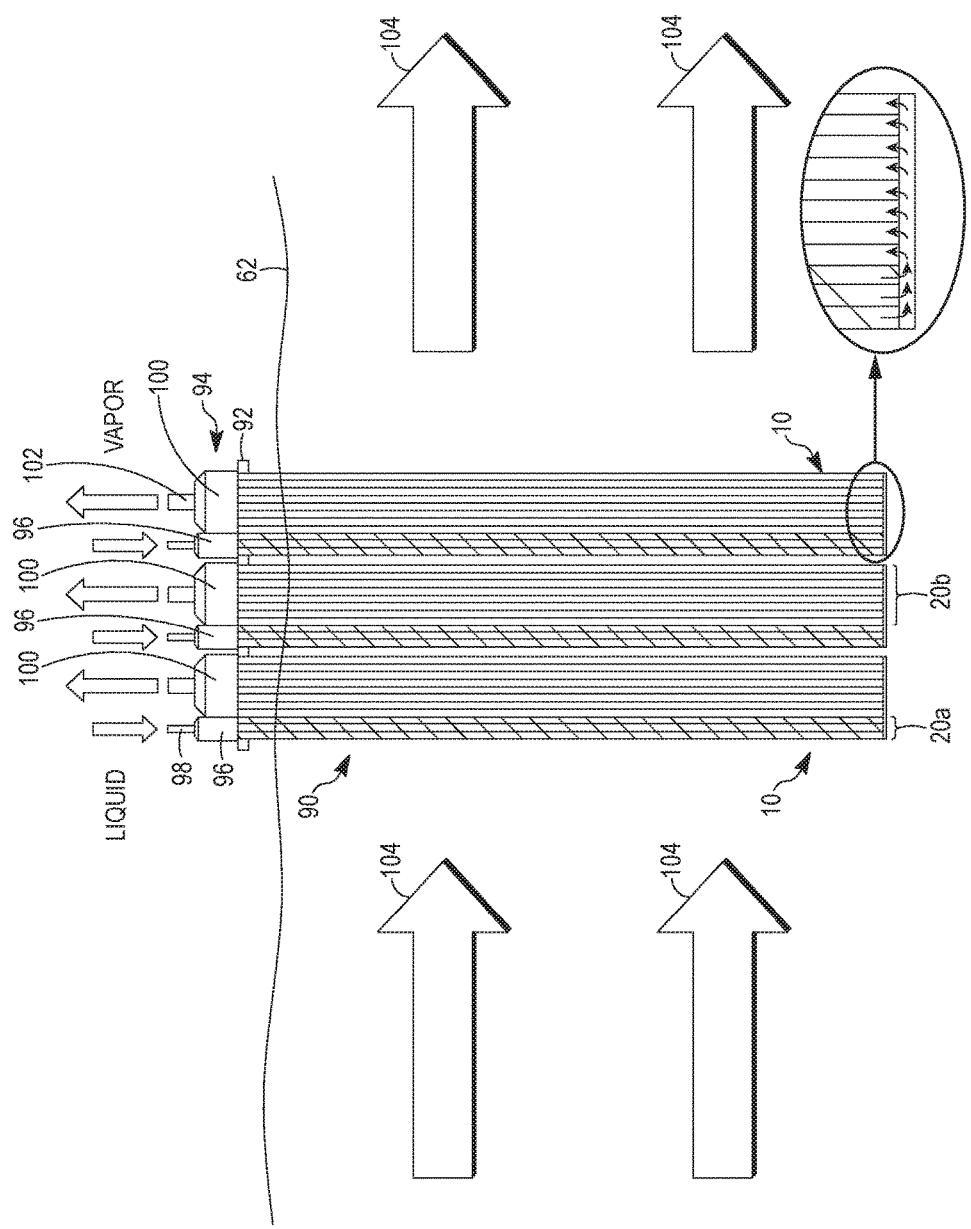

HEAT EXCHANGE MEMBER AND HEAT EXCHANGERS UTILIZING THE HEAT EXCHANGE MEMBER

RELATED APPLICATIONS

This application claims the benefit of and priority to provisional patent application Ser. No. 62/101,525, filed on Jan. 9, 2015, entitled "MULTI-HOLLOW EXTRUDED HEAT EXCHANGE MEMBER WITH SAME SIDE INLET AND OUTLET, AND HEAT EXCHANGER INCORPORATING THE SAME," the disclosure of which is hereby incorporated herein by reference in its entirety.

TECHNICAL FIELD

The embodiments relate generally to a heat exchange member including an extruded member and a plug, and heat exchangers utilizing such heat exchange members.

BACKGROUND

Heat exchangers (HXs) come in several form factors from shell and tube (S&T) to plate HX layouts. For marine applications with flowing seawater, HXs preferably transfer heat efficiently, are low-cost, and have a relatively long life span. For some applications, such as ocean thermal energy conversion (OTEC) or liquid natural gas (LNG) regasification, HXs are typically built in a relatively large size to be cost effective.

Two important design factors for seawater HXs are maintenance access and the ability to survive the harsh corrosion environment of seawater. Corrosion in a seawater environment can take many forms, including crevice corrosion, pitting corrosion, and erosion corrosion. Therefore, HX construction that has improved corrosion resistance and maintenance access would be beneficial.

SUMMARY

A heat exchange member is disclosed that has enhanced corrosion resistance, including when used in seawater or other corrosive environments. A heat exchanger is also disclosed that utilizes a plurality of the heat exchange members in an array and that provides improved maintenance access to the heat exchange members.

In one embodiment, a heat exchanger is disclosed. The heat exchanger includes a heat exchange member that includes a first extruded member having a first end and a second end. The first extruded member forms a plurality of fluid passages that are in fluid communication with the first end of the first extruded member and the second end of the first extruded member. At least one of the fluid passages is an inlet fluid passage, and at least one of the fluid passages is an outlet fluid passage. A plug is fixedly coupled to the second end of the first extruded member. The plug forms a plug fluid passage that fluidically interconnects the inlet fluid passage at the second end of the first extruded member with the outlet fluid passage at the second end of the first extruded member.

In use, an inlet flow of a fluid is directed into the inlet fluid passage at a first end of the extruded member, with the fluid then flowing toward a second end of the extruded member, through a plug fluid passage in the plug and into the outlet fluid passage. The fluid then flows through the outlet fluid passage to the first end of the extruded member where the fluid then exits the extruded member. While the fluid is flowing through the fluid passages, the fluid can exchange heat with another fluid, for example water, in which the extruded member is disposed.

In one embodiment, a plurality of the heat exchange members can be used together in an array as part of a heat exchanger. In one embodiment, the heat exchanger can be an open channel heat exchanger where the first ends of the extruded members can be attached to a tube sheet with the extruded members arranged side-by-side with a space between adjacent extruded members, and where the second, opposite ends of the extruded members having the plugs are not secured to a tube sheet, but can instead be considered free or unattached. The array of extruded members can be arranged in a body of water, for example seawater, fresh water, or brackish water, with the second, opposite ends disposed in the water and the first ends located above the surface of the water and not in direct contact with the water. The water on the outside of the extruded members exchanges heat with the fluid flowing through the extruded members. In other embodiments, the extruded members can be disposed in a fluid other than water; for example, a gas such as air, other liquids, or solids.

The fluid flowing through the extruded member can be any form or phase of fluid including liquids, gases, plasmas, and solids. For example, the fluid entering the inlet fluid passage can be a liquid and can remain a liquid to the outlet but with a higher or lower temperature due to the heat exchange with the fluid on the outside of the extruded member (i.e. liquid in/liquid out). In another embodiment, the fluid entering the inlet fluid passage can be a liquid that is changed into a gaseous form as a result of the heat exchange by the time the fluid reaches the outlet (i.e. liquid in/gas out). In still another embodiment, the fluid entering the inlet fluid passage can be a gas that is changed into liquid form as a result of the heat exchange by the time the fluid reaches the outlet (i.e. gas in/liquid out). In another embodiment, the fluid entering the inlet fluid passage can be a gas and remains a gas throughout (i.e. gas in/gas out). In still other embodiments, other phase regimes can include solid in/solid out, solid in/liquid out, and liquid in/solid out.

With water contact surfaces exposed on the outside of the extruded members, it is possible to readily coat the surfaces of the heat exchange member(s) that will be exposed to water with anti-fouling and anti-corrosion agents. It is also possible to easily clean the outer surfaces to reduce biofouling and related pitting corrosion.

The extruded members can also be arranged in such a way that all water contact surfaces can be seen for visual inspection and cleaning when an array of the heat exchange members is removed.

The relatively low cost of the single tube sheet, removal of a pressure vessel, and simple manifolding allows construction of significantly smaller arrays of extruded members that are easier to assemble, remove/install, transport, and maintain.

In one embodiment, the only joint of the heat exchanger that is directly exposed to water is a friction stir welded (FSW) corrosion resistant joint. FSW joints have inherent corrosion inhibition characteristics because of the fine grain and microstructure created. In addition, the multi-hollow extrusions described herein are extremely cheap relative to surface area; machining and FSW can be automated for rapid production that is length-independent; there is no costly pressure vessel; the tube sheets are likely to be thinner and smaller in total dimensions, reflecting substantially cheaper costs; and extruded member-tube sheet joints may only require rolling or expansion versus welding. Assembly, transport, and maintenance is much easier/cheaper and facilitates heat exchanger assembly on-site.

In another embodiment, a method of manufacturing a heat exchange member is disclosed. The method includes positioning an extruded member having a first end and a second end, the extruded member forming a plurality of fluid passages that are in fluid communication with the first end of the extruded member and the second end of the extruded member, at least one of the fluid passages comprising an inlet fluid passage and at least one of the fluid passages comprising an outlet fluid passage. The method further includes inserting a plug into the second end of the extruded member, the plug forming a plug fluid passage that fluidically interconnects the inlet fluid passage at the second end of the extruded member with the outlet fluid passage at the second end of the extruded member. The method further includes friction stir welding the plug and the extruded member to fixedly couple the plug to the second end of the extruded member by a friction stir weld.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 11 illustrates an example of a heat exchanger according to one embodiment;

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first end" and "second end," and does not imply a priority, a type, an importance, or other attribute, unless otherwise stated herein.

As used herein and in the claims, the articles "a" and "an" in reference to an element refers to "one or more" of the element unless otherwise explicitly specified.

A multi-hollow extrusion or extruded member refers to a member that is extruded so that it is a one-piece construction. The extruded members disclosed herein generally have a first end and a second end, and form at least two fluid passages that extend longitudinally from the first end toward the second end.

A tube sheet is a plate-like member having a plurality of openings to which a plurality of the extruded members may be attached. A heat exchange member is a structure that includes at least one of the extruded members and a plug that is fixedly attached to one end of the extruded member to close the end of the extruded member so that fluid enters and exits the heat exchange member via the same end of the extruded member.

Figure 1B:
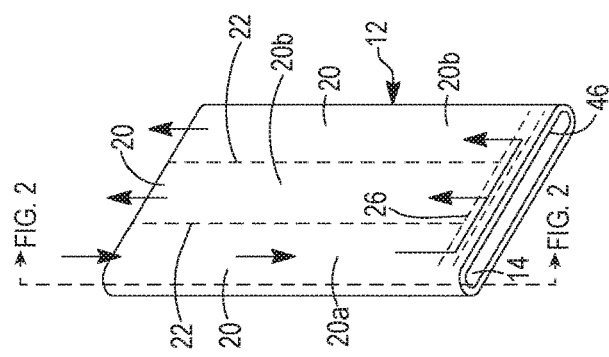
FIG. 1B illustrates an assembled view of the heat exchange member illustrated in FIG. 1A according to one embodiment.
Figure 1A:
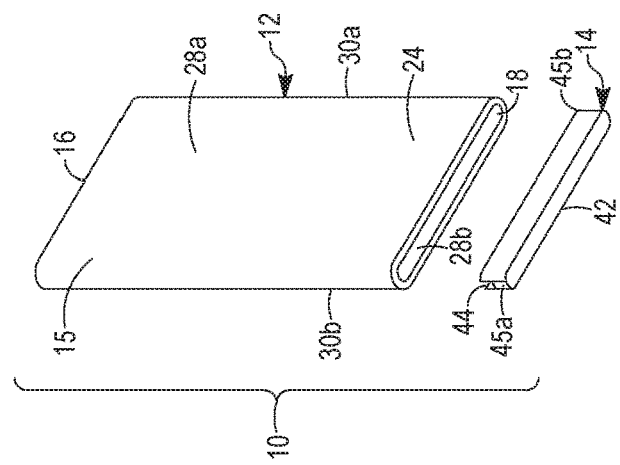
FIG. 1A illustrates an exploded view of a heat exchange member with an extruded member and a plug according to one embodiment.

With reference initially to FIGS. 1A and 1B, a heat exchange member 10 is illustrated. The heat exchange member 10 includes an extruded member 12 (hereinafter "extruded member 12" for purposes of brevity) and a plug 14. The extruded member 12 is a one-piece construction that is extruded from a material that permits heat exchange to occur between a fluid flowing through the extruded member 12 and a fluid contacting the outside surface 15 of the extruded member 12. Examples of materials that may be used to form the extruded member 12 include, but are not limited to, metals such as aluminum or non-metals such as plastic.

While the embodiments are not limited to any particular dimensions, in some embodiments a width of the extruded member 12 may range from about 2 inches to about 24 inches; a thickness of the extruded member 12 may range from about 0.5 inches to about 3 inches; and a length of the extruded member 12 may range from about 5 feet to about 50 feet.

Figure 2:
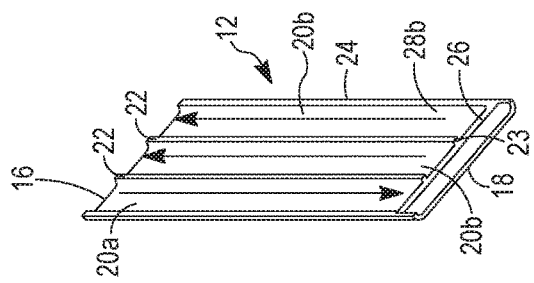
FIG. 2 illustrates a sectional view taken along the plane of line 2 of the heat exchange member illustrated in FIGS. 1A and 1B according to one embodiment.

Referring now to FIG. 2, the extruded member 12 has a first end 16, which is open, and a second end 18, which is also open, and forms a plurality of fluid passages 20, 20a, 20b (generally, fluid passages 20) that extend longitudinally from the first end 16 toward the second end 18. The extruded member 12 has a minimum of two fluid passages 20 that are fluidically separated from one another, with at least one fluid passage 20a comprising an inlet fluid passage for an inlet flow of fluid and with at least one fluid passage 20b comprising an outlet fluid passage for an outlet flow of fluid. With reference to FIGS. 1B and 2, the illustrated extruded member 12 includes three internal fluid passages 20 defined by a pair of longitudinally extending internal walls 22 that are integrally formed with an exterior wall 24 of the extruded member 12. However, as will be discussed further below for FIGS. 4A-C, the extruded member 12 can have different constructions with different numbers of fluid passages 20, and different combinations of inlet and outlet fluid passages 20. In this illustrated example, one of the fluid passages 20 defines an inlet fluid passage 20a for inlet flow of fluid, and two of the fluid passages define outlet fluid passages 20b for outlet flow of fluid.

Because a heat exchange member 10 comprises both an extruded member 12 and a fixedly coupled plug 14, attributes of the extruded member 12 may be referred to in the context of a heat exchange member 10. For example, a reference to a first end 16 of a heat exchange member 10 will refer to the first end 16 of the extruded member 12 that makes up the heat exchange member 10. Similarly, a reference to a second end 18 of a heat exchange member 10 will refer to the second end 18 of the extruded member 12 that makes up the heat exchange member 10.

With continued reference to FIGS. 1B and 2, the internal walls 22 extend generally from the first end 16 toward, but stopping short of, the second end 18. In the illustrated example, lower ends 23 of the internal walls 22 stop at a lip, or ledge, 26 that is internally formed in the extruded member 12 at a distance above the second end 18. The ledge 26 forms a stop against which the plug 14 can abut to define a fully installed position of the plug 14 in the second end 18. In one exemplary embodiment, the ledge 26 can be formed by machining the extruded member 12. For example, in one embodiment, a router bit with a suitable diameter may be inserted into the second end 18 a predetermined distance and moved along the length of the second end 18, and then removed to form the ledge 26.

The extruded member 12 can have any shape as long as the fluid passages 20 are defined and heat exchange can take place between a fluid flowing through the fluid passages 20 and a fluid contacting the outside surface 15 of the extruded member 12. In some embodiments, the extruded member 12 (and the heat exchange member 10 as a whole) is generally flat and shaped like a rectangular plate. The extruded member 12 can include generally planar, opposite rectangular face walls 28a, 28b and opposite, rounded side edges 30a, 30b that interconnect the face walls 28a, 28b. However, other shapes and configurations for the extruded member 12, including the face walls 28a, 28b and the side edges 30a, 30b, are possible.

Although the extruded member 12 in FIGS. 1-2 is illustrated as having three fluid passages 20, the extruded member 12 can have a smaller or larger number of fluid passages 20. For example, the extruded member 12 can have only two fluid passages 20, one fluid passage for inlet fluid flow and the other fluid passage for outlet fluid flow.

Figure 3:
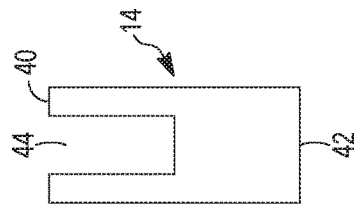
FIG. 3 illustrates a side view of a plug according to one embodiment.

FIG. 3 illustrates a side view of the plug 14 according to one embodiment. The plug 14 is separate from but fixedly coupled to the extruded member 12 at the second end 18 of the extruded member 12. The plug 14 is shaped to close the second end 18 of the extruded member 12 and fluidically interconnect the fluid passages 20 via a plug fluid passage 44. The plug 14 can have any shape that is suitable for achieving these functions. In the illustrated embodiment, the plug 14 is shaped and sized to fit within the open second end 18 in close fitting relationship, for example an interference or press fit, with the face walls 28a, 28b and the side edges 30a, 30b. When fully installed, an upper edge 40 of the plug 14 abuts against the ledge 26, and a bottom surface 42 of the plug is substantially flush with a bottom surface of the second end 18 so that the plug 14 is fully contained within and does not project beyond the extruded member 12.

As best seen in FIGS. 1A, 1B, and 3, the plug 14 includes the plug fluid passage 44 formed therein that fluidically interconnects the fluid passages 20 so that fluid flowing through the inlet fluid passage(s) 20a can flow into the outlet fluid passage(s) 20b at the second end 18. The plug fluid passage 44 can be formed in the plug 14 in any suitable manner; for example, by casting or machining the plug fluid passage 44. In the illustrated embodiment, the plug fluid passage 44 can extend from and through one side edge 45a of the plug 14 to and through an opposite side edge 45b.

In some embodiments the plug 14 is a one-piece construction that is formed from a material that permits heat exchange to occur between a fluid flowing through the extruded member 12 and a fluid contacting outer surfaces of the plug 14. Examples of materials that can be used to form the plug 14 include, but are not limited to, metals such as aluminum or non-metals such as plastic. In one embodiment, the plug 14 is formed of the same material as the extruded member 12.

The plug 14 is fastened to the extruded member 12 in a manner to prevent removal of the plug 14 without destroying either the plug 14 or the portion of the extruded member 12 adjacent to the plug 14. In one embodiment, the plug 14 and the extruded member 12 are friction stir welded together to form a friction stir weld. Friction stir welding employs a rotating probe or pin that is inserted into the joint between the two elements, in this case the extruded member 12 and the plug 14. The friction between the probe and materials that make up the extruded member 12 and the plug 14 causes the material in the immediate vicinity of the probe to heat up to temperatures below the melting point of the material. The material softens, but because the material remains in a solid state, the original material properties are retained. Movement of the probe about the joint forces the softened material from the two pieces toward the trailing edge of the probe, causing the adjacent regions to fuse and thereby forming a friction stir weld. FIG. 1B illustrates an example of a weld line 46 along which the extruded member 12 and the plug 14 can be friction stir welded together to form a friction stir weld.

Distinct from other common joining techniques, such as fusion welding, brazing, etc., friction stir welding has several performance advantages. In particular, the resultant friction stir weld is comprised of the same material as the joined sections. As a result, galvanic corrosion due to contact between dissimilar metals at the joint can be reduced or eliminated. Furthermore, the resultant friction stir weld retains the material properties of the material of the joined sections.

When the heat exchange member 10 is to be used in seawater or other corrosive fluids, a friction stir weld is preferably used to join the plug 14 to the extruded member 12. The use of friction stir welding can mitigate corrosion effects from micro-grain boundaries leading to reduced intergranular corrosion. While for purposes of illustration the embodiments may be discussed in the context of seawater, the embodiments are not limited to use in seawater, and have applicability for use with any fluids, including any corrosive fluids.

In use of the heat exchange member 10, a fluid is directed into one of the fluid passages 20, for example the inlet fluid passage 20a, at the first end 16 of the extruded member 12, as shown by the arrow in FIG. 1B. The fluid flows through the inlet fluid passage 20a toward the second end 18 where the plug fluid passage 44 of the plug 14 directs the fluid into the outlet fluid passages 20b as indicated by the arrows in FIG. 1B. The fluid then flows through the outlet fluid passages 20b toward the first end 16 and out the first end 16. The fluid can be directed into and from the respective fluid passages 20a, 20b using suitable manifolding as described further below. At the same time, a fluid is flowing around and in contact with the outside surfaces of the heat exchange member 10. Depending on the temperature differences between the two fluids, i.e. the fluid within the heat exchange member 10 and the fluid contacting the outside surfaces of the heat exchange member 10, heat is exchanged between the fluids.

The two fluids used in the heat exchange process can be any form, phase, or quality (e.g. mixture of both liquid and gas) of fluids. For example, the fluid entering and exiting the heat exchange member 10 can be a liquid; the fluid can enter the heat exchange member 10 as a liquid and exit the heat exchange member 10 in gaseous form; the fluid can enter the heat exchange member 10 as a gas and can exit as a liquid; and the fluid can enter the heat exchange member 10 as a mixture of gas and liquid and can exit the heat exchange member 10 as a mixture of gas and liquid, a liquid, or a gas. Many other examples are possible, including the fluid being a plastic solid. The fluid on the outside of the heat exchange member 10 can be a gas, a liquid, a plastic solid, or mixtures thereof.

In one embodiment, the heat exchange member 10 is used in a vertical arrangement as shown in FIG. 1B with the fluid passages 20 oriented substantially vertically, and the fluid enters the inlet fluid passage 20a as a liquid. The liquid absorbs heat from the fluid outside of the heat exchange member 10, causing the liquid to vaporize into a gas. The gas ultimately flows out of the heat exchange member 10 through the outlet fluid passages 20b.

Figure 4A:
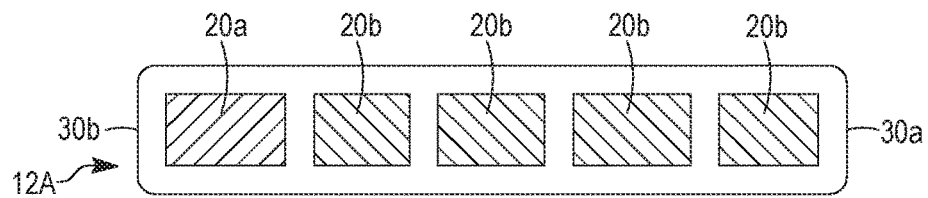
FIGS. 4A-4C illustrate various top views of exemplary embodiments of extruded members.
Figure 4B:
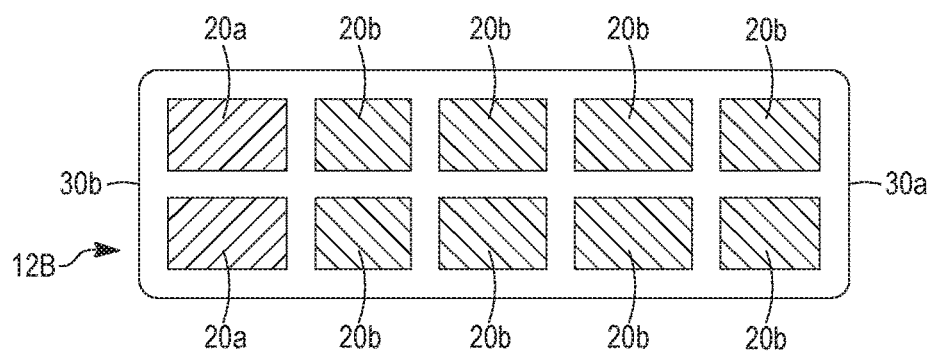
Figure 4C:
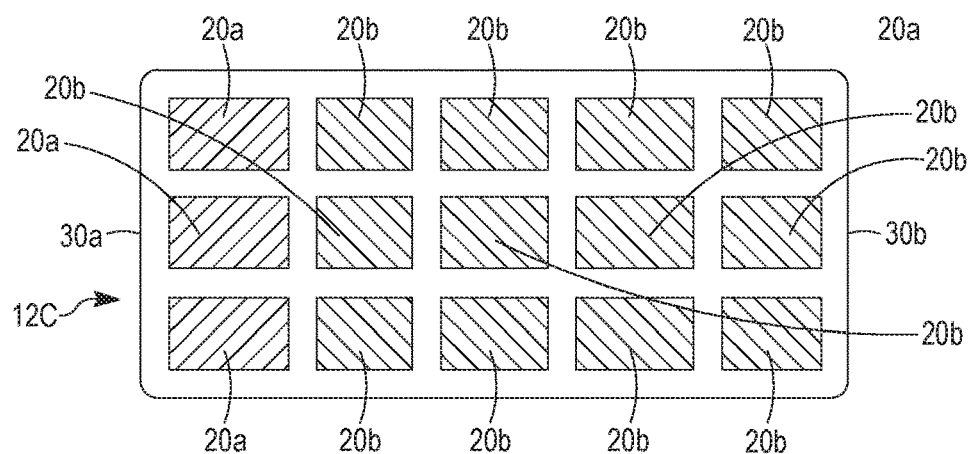

FIG. 4A illustrates a top view of an embodiment of an extruded member 12A where the extruded member 12A has a total of five fluid passages with the inlet fluid passage 20a being for inlet fluid flow and the remaining outlet fluid passages 20b being for outlet fluid flow. FIG. 4B illustrates a top view of an embodiment of an extruded member 12B where the extruded member 12B has ten fluid passages with two of the inlet fluid passages 20a being for inlet fluid flow and the remaining outlet fluid passages 20b being for outlet fluid flow. FIG. 4C illustrates a top view of still another embodiment of an extruded member 12C where the extruded member 12C has fifteen fluid passages with three of the inlet fluid passages 20a being for inlet fluid flow and the remaining outlet fluid passages 20b being for outlet fluid flow. Many other numbers of fluid passages 20, as well as ratios of fluid passages 20 for inlet flow of fluid and outlet flow of fluid, are possible.

In all of the embodiments described herein, the fluid passages 20 can have any cross-sectional shape that is suitable for fluid flow. In FIGS. 1-2, the fluid passages 20 are generally rectangular when viewed in cross-section or from an end, with the two outer fluid passages 20 each having one curved end formed by the curved side edges 30a, 30b. FIGS. 4A-4C illustrate all of the fluid passages 20a, 20b as being generally rectangular in shape. In FIGS. 4A-4C, the side edges 30a, 30b are illustrated as being flat instead of curved as in FIGS. 1-2.

Figure 5A:
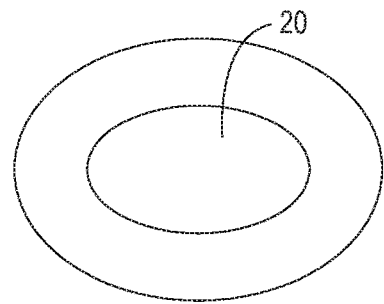
FIGS. 5A-5C illustrate various exemplary embodiments of cross-sectional shapes of fluid passages.
Figure 5B:
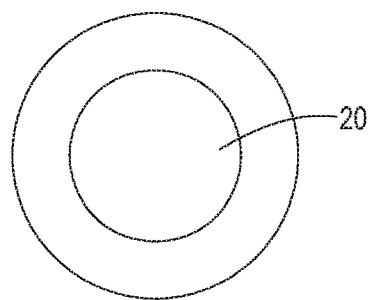
Figure 5C:
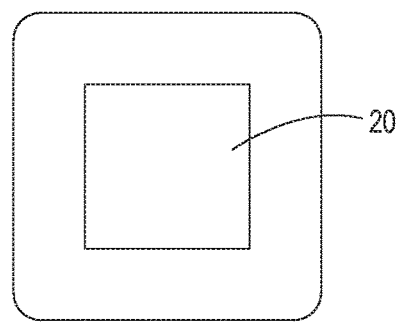

FIGS. 5A-5C illustrate various exemplary cross-sectional shapes of the fluid passages 20, with FIG. 5A depicting an oval shape fluid passage 20, FIG. 5B depicting a round shape fluid passage 20, and FIG. 5C depicting a square shape fluid passage 20.

Figure 6A:
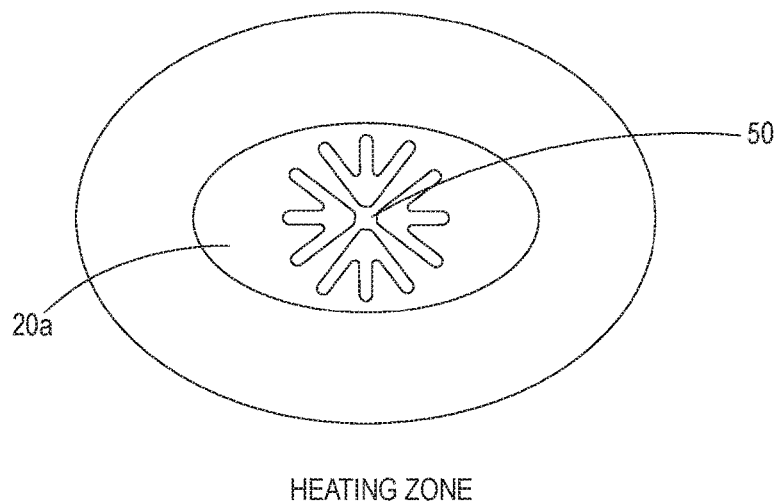
FIGS. 6A-6B illustrate various exemplary embodiments of integrated turbulators that can be integrally formed in one or more of the fluid passages of the extruded members.
Figure 6B:
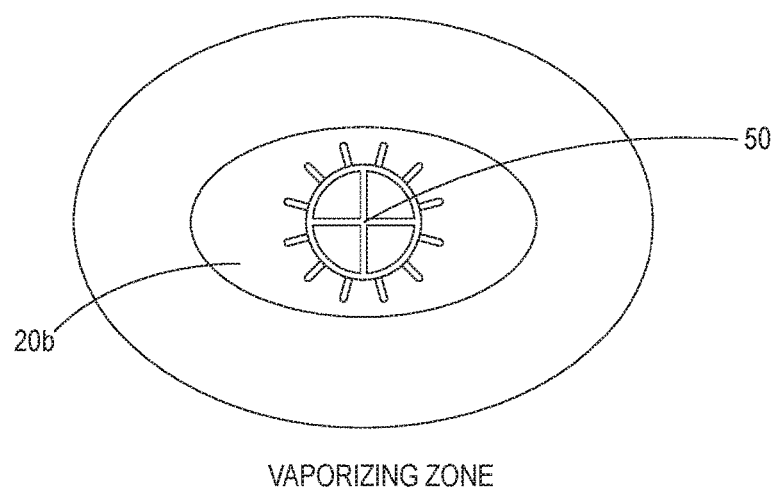

To enhance heat transfer, various heat transfer turbulators can be integrally formed in or added to one or more of the fluid passages 20. For example, with reference to FIGS. 6A and 6B, the turbulators can take the form of extruded fins 50a, 50b that are integrally formed in the fluid passage 20a and/or in the fluid passage 20b during the extrusion process of the extruded member 12 to increase the surface area and induce turbulent flow and thus increase the heat transfer. The extruded fins 50a, 50b may therefore be an integral, one-piece construction with the extruded member 12. It will be apparent that turbulators may be used in any fluid passage shape, including those depicted in FIGS. 5A-5C.

Figure 7A:
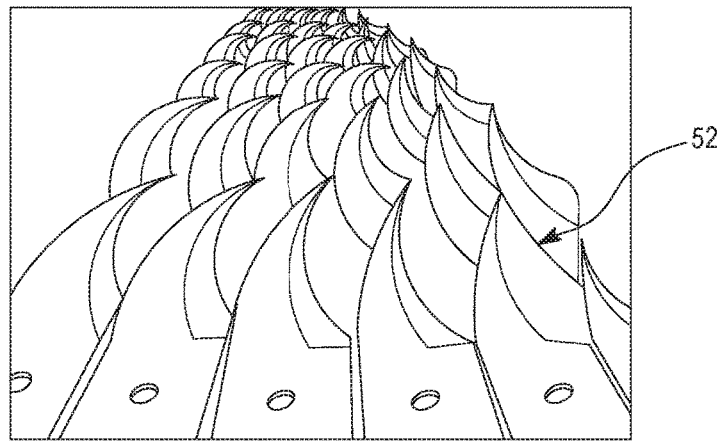
FIG. 7A-7B illustrate various exemplary embodiments of turbulators that can be installed within one or more of the fluid passages of the extruded members.
Figure 7B:
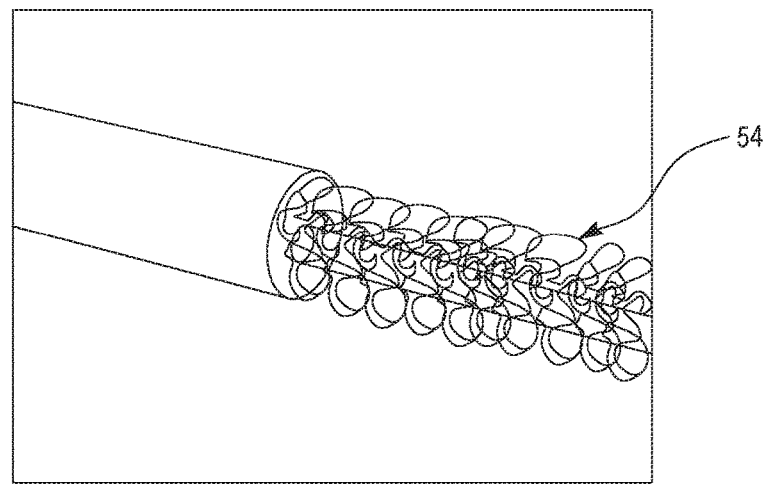

FIGS. 7A and 7B illustrate examples of turbulators that take the form of inserts 52, 54, for example, and are made of metal or other suitable materials, that are initially separate from, but can be installed within, one or more of the fluid passages 20a, 20b of the extruded member 12 to induce turbulent flow and thus increase the heat transfer. The inserts 52, 54 can be secured within the passages in any suitable manner, for example by being secured to the walls forming the passages, or being secured at one or more ends of the inserts 52, 54 to the plug 14 and/or to structure at the first end 16.

Figure 8:
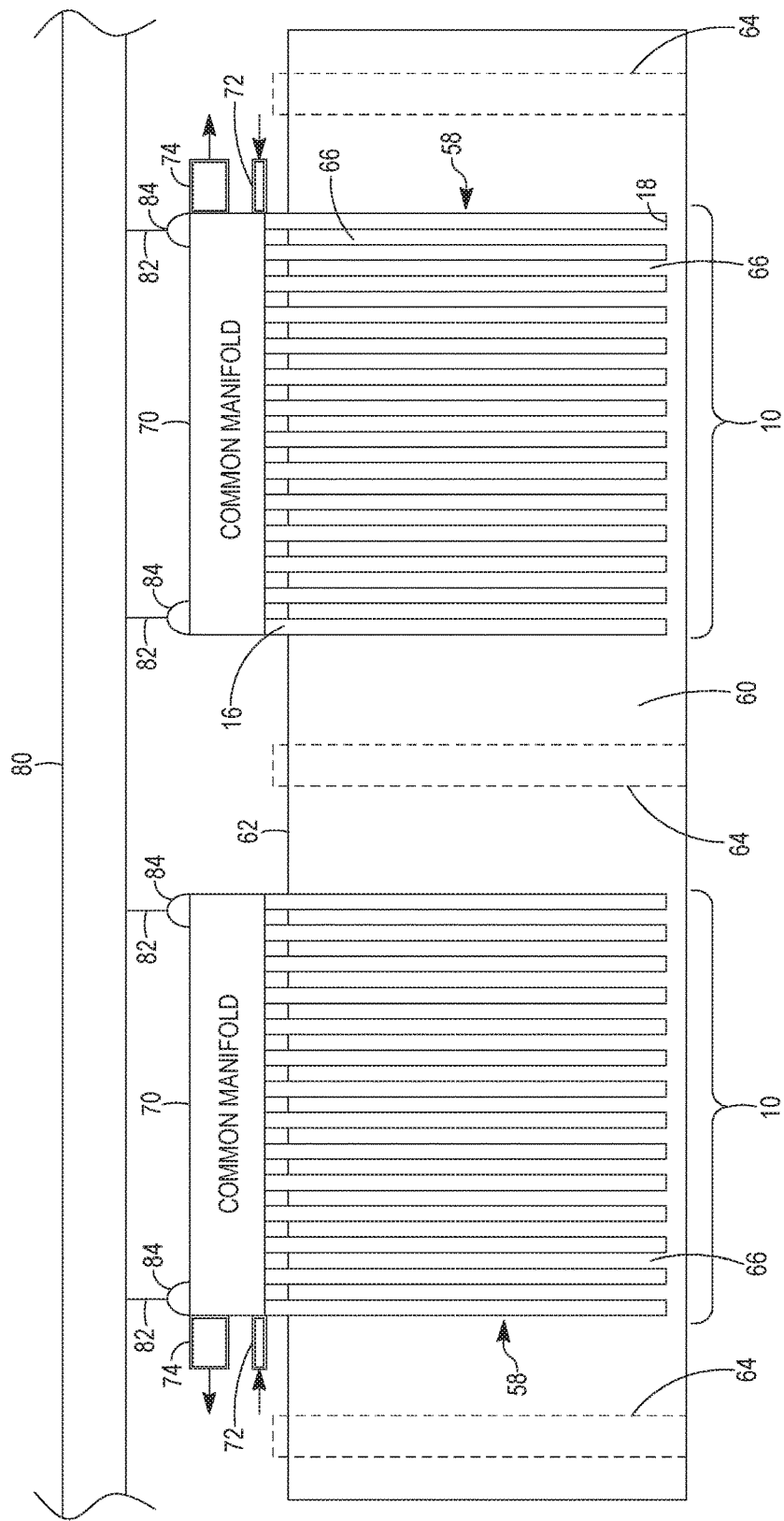
FIG. 8 illustrates an example of a heat exchanger that incorporates a plurality of the heat exchange members according to one embodiment.

In one exemplary embodiment, the heat exchange member 10 can be used by itself to form a heat exchanger. In another embodiment, a plurality of the heat exchange members 10 can be used together in an array to form a heat exchanger 58. In this regard, FIG. 8 illustrates an embodiment where a plurality of the heat exchange members 10 are suspended from their first ends 16 so that the heat exchange members 10 extend downwardly from a common support structure, for example, a tube sheet 92 (FIG. 9) or a common manifold structure 70 discussed further below, and are oriented vertically in a side-by-side arrangement. The heat exchange members 10 are disposed substantially in a body of fluid 60, for example, water, with the first ends 16 of the heat exchange members 10 disposed above a fluid surface 62 and the second ends 18 of the heat exchange members 10, and most of the heat exchange member 10, being disposed below the fluid surface 62.

The body of fluid 60 can be substantially still so that the fluid thereof has little or no flow. In another embodiment, the fluid can be flowing past the heat exchange members 10, for example, into or out of the page in FIG. 8, or in a cross-flow direction from right to left or from left to right in FIG. 8, as well as all angles between cross-flow and flow into or out of the page in FIG. 8. The body of fluid 60 can be, but is not limited to, air, seawater, brackish water or fresh water, or other fluid that can be used for heat exchange.

If the fluid in the body of fluid 60 is flowing, the fluid can randomly flow past the heat exchange members 10. Alternatively, the heat exchangers 58 can be disposed between walls or guides 64 that serve to channel the fluid flow past the heat exchange members 10 in a more optimum manner. For example, FIG. 8 illustrates guides 64 that extend into and out of the page in FIG. 8 that form flow channels in which the heat exchangers 58 are located. The guides 64 channel the flowing fluid so that the fluid flows past the heat exchange members 10.

The heat exchangers 58 in FIG. 8 form open channel heat exchangers in which the fluid flowing on the outside of the heat exchange members 10 that exchanges heat with the fluid flowing through the heat exchange members 10 is unconstrained in that the exterior fluid is not contained within a housing or pressure vessel. Gaps between the heat exchange members 10 form flow channels 66 through which the exterior heat exchange fluid flows so as to contact substantially the entire exterior surfaces of the heat exchange members 10.

In FIG. 8, the heat exchange members 10 are illustrated as being substantially evenly spaced so that the flow channels 66 are substantially equal in size. However, the spacing between the heat exchange members 10 need not be equal and the sizes of the flow channels 66 can vary to alter heat exchange characteristics.

The first ends 16 of the extruded member 12 are illustrated as being supported directly or indirectly from the common manifold structure 70 that provides one or more inlet manifolds (discussed further below with respect to FIGS. 9 and 12) in communication with one or more inlets 72 and with the one or more inlet fluid passages 20a in the extruded members 12 so that the fluid entering the heat exchanger 58 via the inlet(s) 72 can flow into the one or more inlet fluid passages 20a. The manifold structure 70 also provides one or more outlet manifolds (discussed further below with respect to FIGS. 9 and 12) in communication with one or more outlets 74 and with one or more outlet fluid passages 20b in the extruded member 12 so that the fluid can exit the heat exchanger 58 via the outlet(s) 74 after exchanging heat in the heat exchange members 10.

The manifold structure 70 may also be disposed above the fluid surface 62. The manifold structure 70 can be supported in position by any suitable support structure 80 that is mounted above the fluid surface 62. FIG. 8 illustrates the support structure 80 as being a generally horizontal platform. The manifold structure 70 is suspended from the support structure 80 by suspension members 82 that are fixed at one end to mounting members 84 on the manifold structure 70 and fixed on their opposite ends to the support structure 80.

Figure 10:
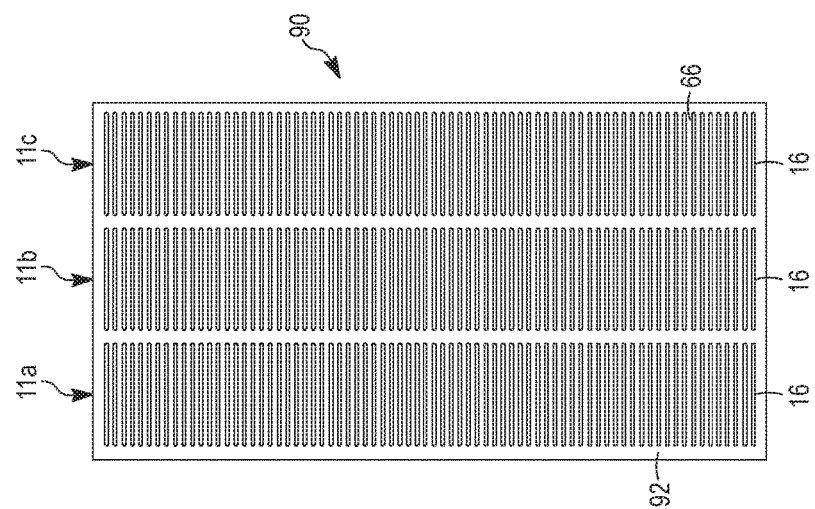
FIG. 10 illustrates a top plan view of a layout of a tube sheet and heat exchange members according to one embodiment.
Figure 9:
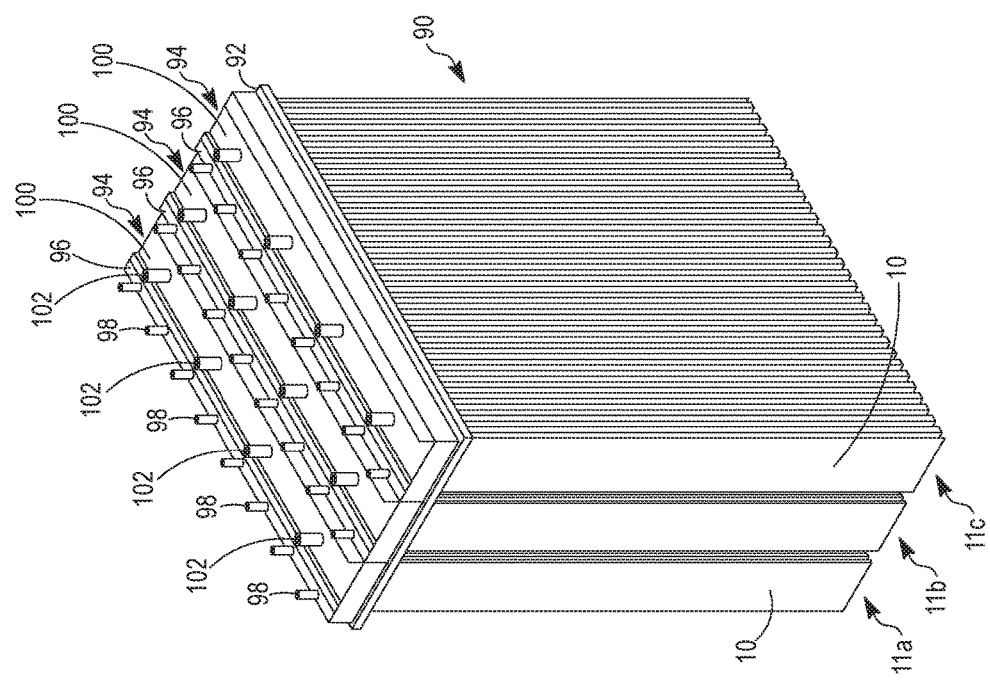
FIG. 9 illustrates a perspective view of a heat exchanger that incorporates a plurality of the heat exchange according to one embodiment.

Referring to FIG. 9 (depicting a perspective view) and FIG. 10 (depicting a top plan view), another exemplary embodiment of a heat exchanger 90 is illustrated. In this embodiment, the heat exchange members are arranged into a plurality of rows 11a, 11b, 11c, for example, three rows in the illustrated example, with each row including a plurality of the heat exchange members 10 similar to the heat exchange members 10 discussed above in the heat exchangers 58 in FIG. 8. In one embodiment, the heat exchanger 90 can be disposed in the body of fluid 60 similar to the heat exchanger(s) 58 in FIG. 8.

In the heat exchanger 90, the first ends 16 of the extruded members 12 are secured to the tube sheet 92 so that the heat exchange members 10 in each row are arranged side-by-side with an equal gap between the heat exchange members 10 to form the flow channels 66. In the illustrated example, the tube sheet 92 is generally rectangular in shape. However, the tube sheet 92 can have any shape including, but not limited to, circular, square, triangular or the like. The first ends 16 of the heat exchange members 10 can be attached to the tube sheet 92 in any suitable manner, for example, using brazing, friction stir welding, or other attachment techniques. In embodiments where the first ends 16 and the tube sheet 92 are above the fluid surface 62 during use of the heat exchanger 90, attachment techniques other than friction stir welding with its anti-corrosion benefits can be used. The tube sheet 92 can be made of any material suitable for attachment to the heat exchange members 10, and when friction stir welding is used to secure the first ends 16 and the tube sheet 92, the tube sheet 92 is preferably made of aluminum or other material used to form the extruded members 12. The use of friction stir welding to connect extruded members 12 to a tube sheet 92 is described in U.S. Published Application No. 2012/0199334, which is incorporated herein by reference in its entirety.

FIG. 10 is a top plan view showing a layout of the tube sheet 92 and the extruded members 12 at the first ends 16, with the heat exchange members 10 arranged into the rows 11a, 11b, 11c and the flow channels 66 between the adjacent heat exchange members 10. In this example, the heat exchange members 10 in each row 11 are substantially aligned with one another so that the flow channels 66 in one row 11 are substantially aligned with the flow channels 66 in each of the other rows 11. However, other arrangements are possible, including offsetting the flow channels 66 so that the flow channels 66 in one row 11 do not align with the flow channels 66 in an adjacent row 11.

Returning to FIG. 9, on the top side of the tube sheet 92 opposite the bottom side facing the heat exchange members 10, each row 11 is provided with a manifold structure 94 similar in function to the manifold structure 70 in FIG. 8. Each manifold structure 94 includes an inlet manifold 96 that extends the length of each row 11 of heat exchange members 10 and that defines a fluid pathway that is in fluid communication with the one or more inlet fluid passages 20a in the heat exchange members 10, but is fluidically isolated from the outlet fluid passage(s) 20b. The inlet manifold 96 further includes one or more inlets 98 along the length thereof permitting the input of a fluid into the heat exchanger 90. Each manifold structure 94 also includes an outlet manifold 100 that extends the length of each row 11 of heat exchange members 10 and defines a fluid pathway that is fluidically separate from the fluid pathway in the inlet manifold 96 and that is in fluid communication with the one or more outlet fluid passages 20b in the heat exchange members 10 but is fluidically isolated from the inlet fluid passage(s) 20a. The outlet manifold 100 further includes one or more outlets 102 along the length thereof permitting the outlet of a fluid from the heat exchanger 90.

With reference to FIG. 11, an example operation of the heat exchanger 90 will now be described. In this example, the heat exchange members 10 are depicted from the side in three rows similar to FIG. 9, with each heat exchange member 10 illustrated as having three inlet fluid passages 20a and eight outlet fluid passages 20b. It will be assumed that the heat exchanger 90 is disposed in a body of water, with the water flowing from left to right in FIG. 11 as indicated by the arrows, the first ends 16 of the extruded members 12, the tube sheet 92, and the manifold structures 94 disposed above the fluid surface 62, and the majority of the remainder of the extruded members 12 including the second ends 18 with the plugs 14 disposed beneath the fluid surface 62 and immersed in the water. In this example, the fluid entering the heat exchanger 90 will be assumed to be a liquefied gas, for example, liquid methane, propane, or nitrogen, that is to be vaporized into a gas in the heat exchanger 90.

The liquefied gas enters the heat exchanger 90 through the one or more inlets 98 in the inlet manifold 96, flows into the fluid pathway in the inlet manifold 96 and then flows into the inlet fluid passages 20a in the heat exchange members 10. In one embodiment, the liquefied gas can be pumped into the inlet manifold 96 using one or more pumps. The liquefied gas flows through the inlet fluid passages 20a toward the plug 14 and the plug fluid passage 44 thereof. During this time, the liquefied gas is exchanging heat with the warmer water flowing outside the heat exchange members 10, which heats the liquefied gas to begin converting the liquid to its gaseous form. The liquefied gas and/or gas then flows via the plug fluid passage 44 in the plug 14 into the outlet fluid passages 20b. As any remaining liquefied gas flows through the outlet fluid passages 20b toward the first ends 16, it continues to absorb heat from the surrounding water to convert all of the liquefied gas into 100% quality gas. The now-gaseous fluid then flows out of the heat exchange members 10 and into the fluid pathway of the outlet manifolds 100, and then out of the outlets 102.

As described above with respect to FIG. 8, in one embodiment the heat exchange members 10 can be mounted so as to extend vertically downward from the manifold structure 94. In one embodiment, other than the connection of the first ends 16 of the extruded members 12 to the tube sheet 92 and/or to the manifold structure 94, the heat exchange members 10 can be unconnected to one another over the remainder of their length. In another embodiment, one or more spacers can be installed in the gaps or flow channels 66 between the face walls 28a, 28b of the heat exchange members 10. The spacers can help to keep the heat exchange members 10 spaced apart from one another and/or can help increase the heat exchange efficiency and/or help optimize fluid flow in the flow channels 66.

Figure 12:
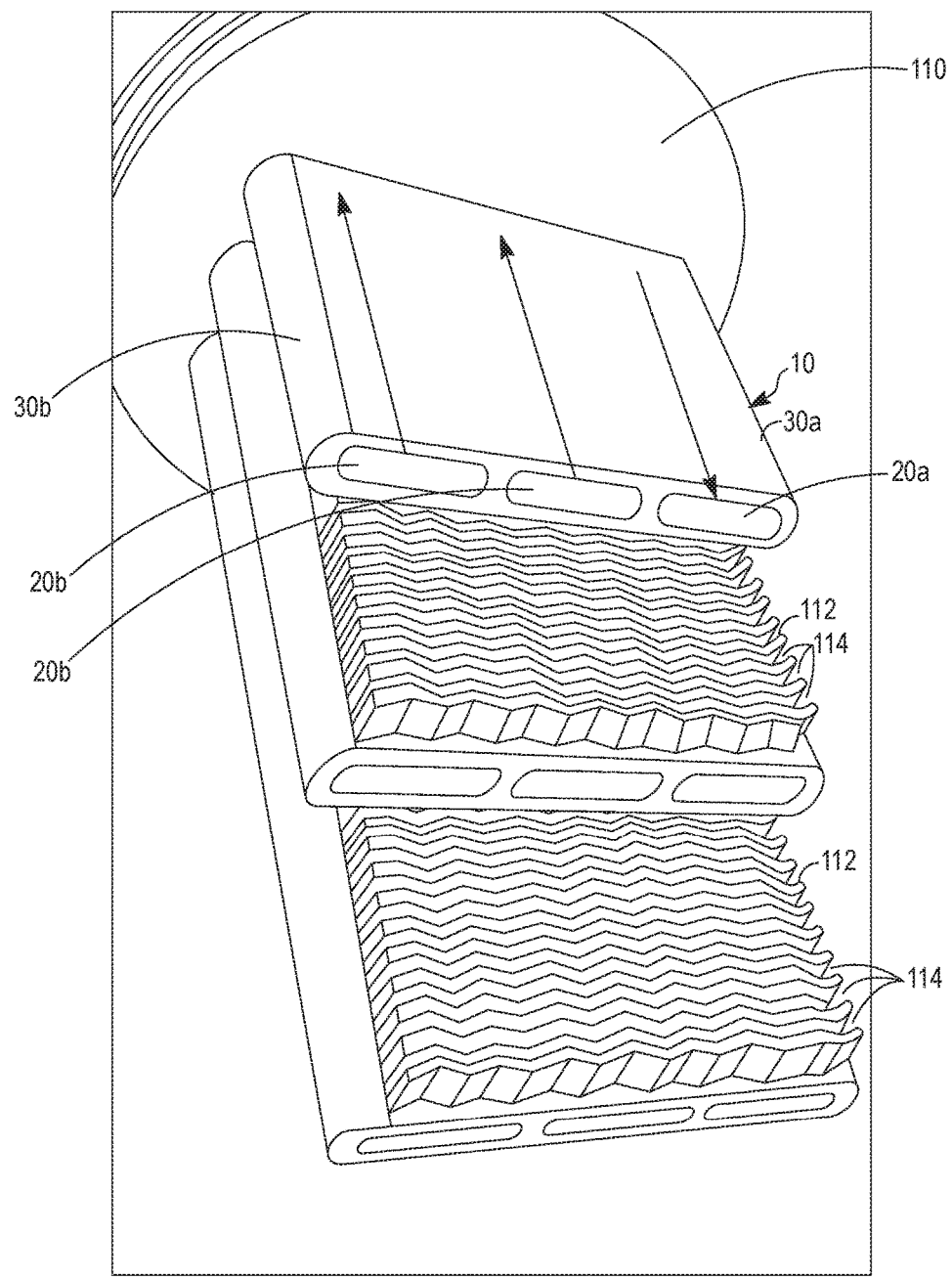
FIG. 12 illustrates spacer fins that can be used between the heat exchange members according to one embodiment.

In this regard, FIG. 12 illustrates a plurality of the heat exchange members 10 connected at their first ends 16 to a circular tube sheet 110, and having optional spacer fins 112 between the heat exchange members 10. The spacer fins 112 can be formed of a metal material, for example, aluminum, and can have a number of shapes, for example, corrugated, wavy, or perforated. In the example illustrated in FIG. 12, the spacer fins 112 can be corrugated and wavy in form and can each have a longitudinal axis that extends generally parallel to the direction of flow through the flow channels 66 between the heat exchange members 10. The spacer fins 112 extend on the outside of each extruded member 12 generally from one rounded side edge 30a to the other rounded side edge 30b overlapping the inlet passage(s) 20a and the outlet passage(s) 20b. In addition, the spacer fins 112 extend from the exterior face wall 28a or 28b of one heat exchange member 10 to the exterior face wall 28a or 28b of the adjacent heat exchange member 10. The spacer fins 112 can be secured to the heat exchange members 10 by brazing, bonding, or other form of attachment. The spacer fins 112 act to space the heat exchange members 10 from each other, increase heat exchange surface area to increase heat exchange efficiency, and help to improve the flow characteristics of the fluid in fluid passages 114 between the heat exchange members 10.

In another exemplary embodiment, the spacer fins 112 can be integrally extruded with the heat exchange members 10 on one or more of the face walls 28a, 28b during extrusion of the heat exchange members 10 so that the spacer fins 112 are integrally formed with the heat exchange members 10. In still another exemplary embodiment, the spacer fins 112 can be machined into one or more of the face walls 28a, 28b after the heat exchange members 10 are extruded so that the spacer fins 112 are integrally formed with the heat exchange members 10.

Figure 13:
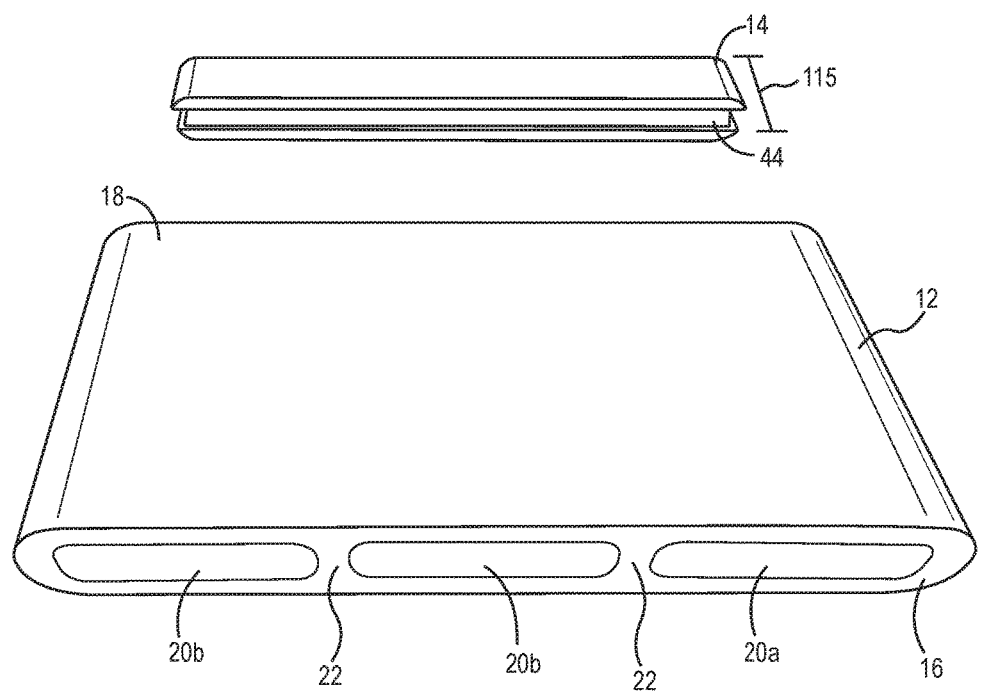
FIG. 13 illustrates a perspective view of the heat exchanger member and the plug according to one embodiment.

FIG. 13 is a perspective view of the extruded member 12 and the plug 14 according to one embodiment. The plug 14 has not yet been fixedly coupled to the extruded member 12. The first end 16 of the extruded member 12 illustrates each fluid passage 20a, 20b being flush with the first end 16. The fluid passages 20a, 20b are formed in part by internal walls 22 that extend from the first end 16 toward the second end 18. The plug 14 has a height 115 and forms the plug fluid passage 44.

Figure 14:
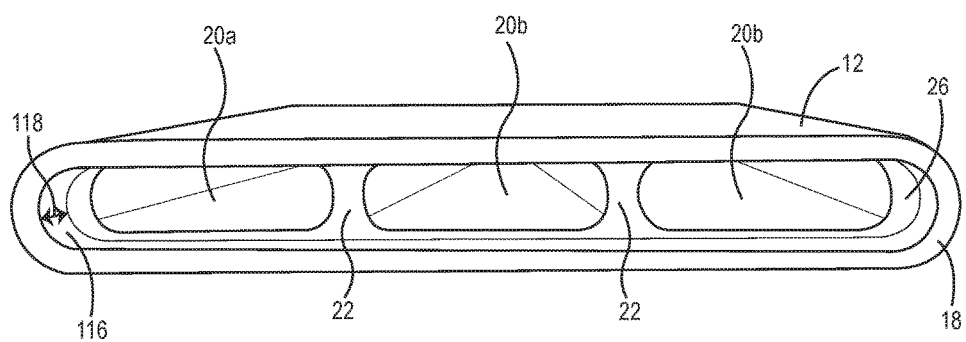
FIG. 14 illustrates a perspective view of the second end of the heat exchange member illustrated in FIG. 13 according to one embodiment.

FIG. 14 is a perspective view of the second end 18 of the extruded member 12 illustrated in FIG. 13 according to one embodiment. The internal walls 22 do not extend all the way to the second end 18 of the extruded member 12, and thus a fluid chamber 116 is formed in the second end 18 that is fluidically coupled to each of the fluid passages 20a, 20b. A distance 118 between the end of the internal walls 22 and the second end 18 is substantially the same as or identical to the height 115 of the plug 14 (FIG. 13). Accordingly, the plug 14 may be inserted into the fluid chamber 116 to contact the internal walls 22, and thereby the surface of the plug 14 will be flush with the second end 18.

Figure 15:
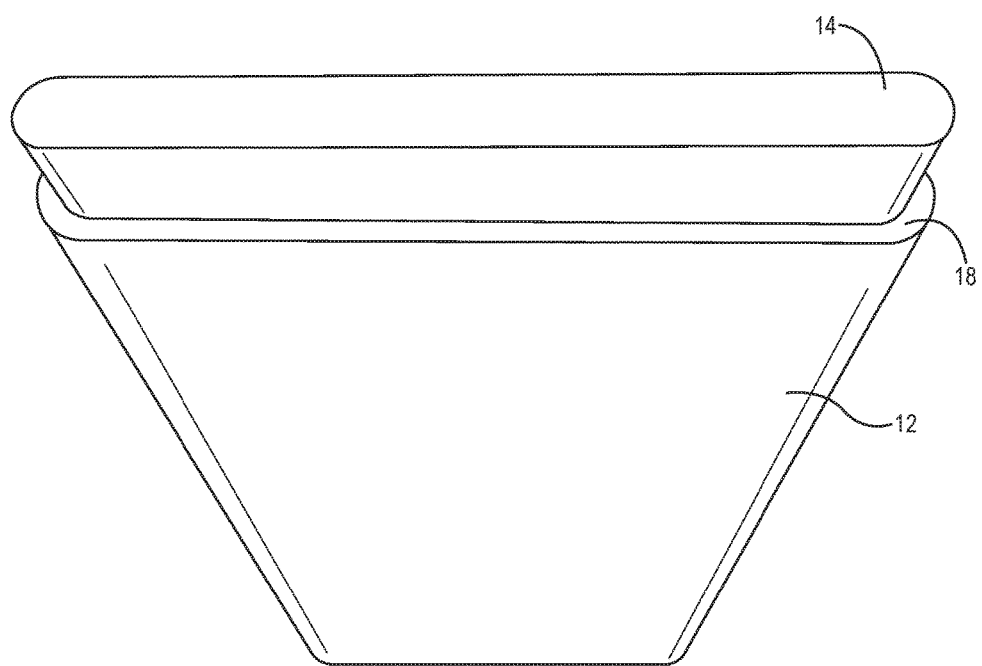
FIG. 15 illustrates a perspective view of the extruded member and the plug at a point in time during assembly.

FIG. 15 is a perspective view of the extruded member 12 and the plug 14 at a point in time during assembly. The plug 14 is initially inserted into the second end 18 of the extruded member 12.

Figure 16A:
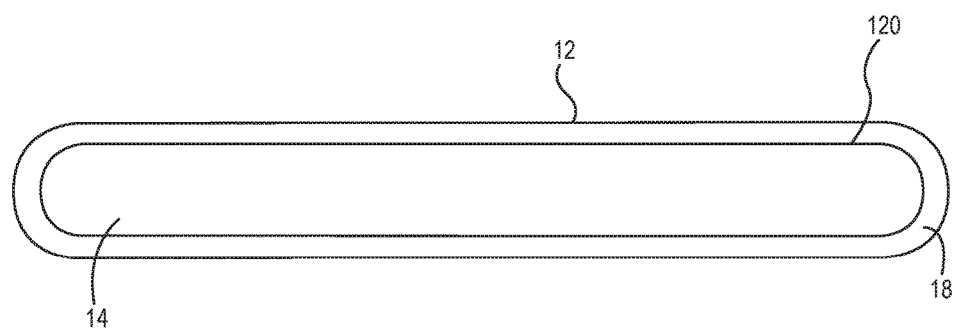
FIG. 16A illustrates a top view of the extruded member and the plug at a subsequent point in time during assembly than that illustrated in FIG. 15.

FIG. 16A is a top view of the extruded member 12 and the plug 14 at a subsequent point in time during assembly from that illustrated in FIG. 15. The plug 14 is urged into the second end 18 until the plug 14 contacts the internal walls 22. At this point, the plug 14 is flush with the second end 18 of the extruded member 12, and an interface 120 exists between the plug 14 and the second end 18 of the extruded member 12.

Figure 16B:
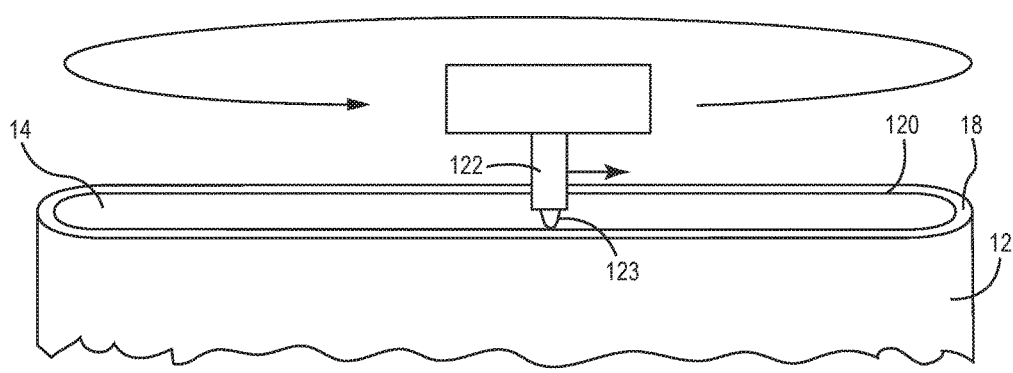
FIG. 16B illustrates a side view of the extruded member and the plug at a subsequent point in time during assembly than that illustrated in FIG. 16A.

FIG. 16B is a side view of the extruded member 12 and the plug 14 at a subsequent point in time during assembly from that illustrated in FIG. 16A. A friction stir weld pin 122 is rotated and inserted into the interface 120 at a plunge point 123. The friction stir weld pin 122 is moved completely about the interface 120 and then removed to form a friction stir weld that joins the extruded member 12 and the plug 14.

Figure 16C:
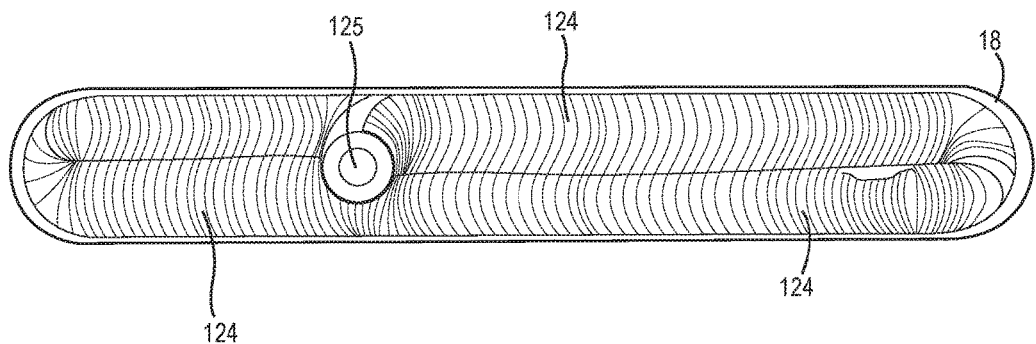
FIG. 16C illustrates a top view of the extruded member and the plug after assembly.

FIG. 16C is a top view of the extruded member 12 and the plug 14 after assembly. The extruded member 12 and the plug 14 are joined by a friction stir weld 124. Using a fixed non-retractable FSW pin tool will create a circular pullout 125. The circular pullout 125 is resistant to corrosion as the micro-grain structure is refined in this zone.

Figure 16D:
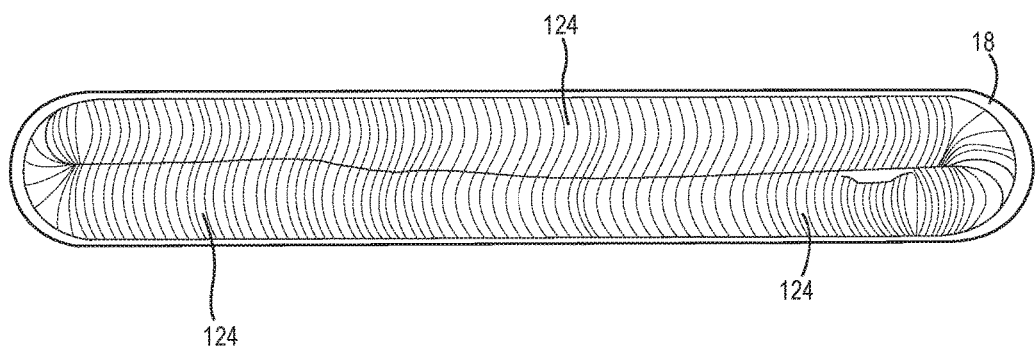
FIG. 16D is a top view of a second end of an extruded member and a plug after assembly using a retractable friction stir weld pin tool.

In the art of FSW, pin tools with various sizes and geometries may be utilized to create a desired weld joint depending on specific application. A retractable FSW pin tool may also be used to eliminate the circular pullout 125 as shown previously in FIG. 16C. FIG. 16D is a top view of the second end 18 of the extruded member 12 and the plug 14 after assembly using the retractable FSW pin tool. The extruded member 12 and the plug 14 are joined by a friction stir weld 124. Post-process machining leaves a second end 18 that appears as a solid piece of metal with no seams or holes.

Figure 17A:
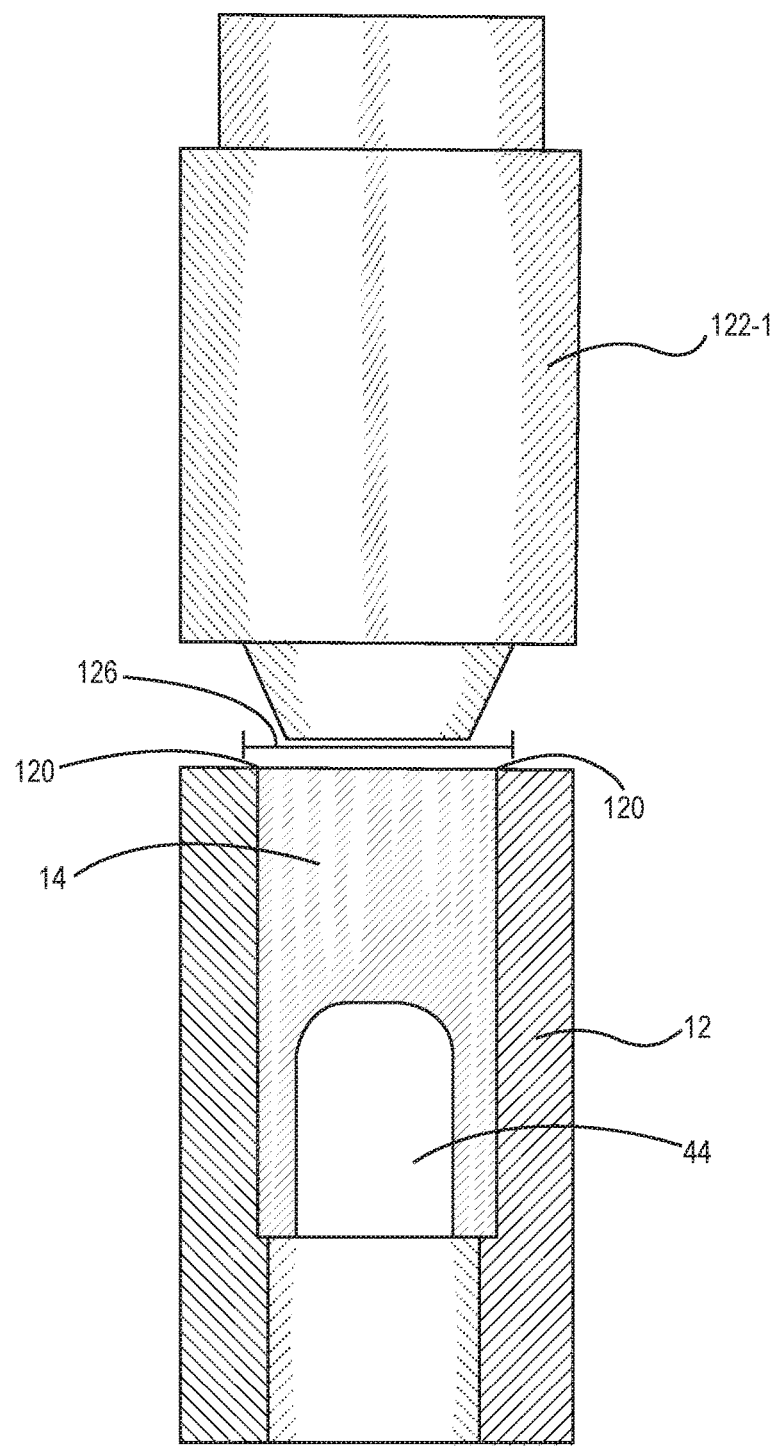
FIGS. 17A-17B illustrate side views of the extruded member and the plug illustrating a friction stir weld process according to another embodiment.
Figure 17B:
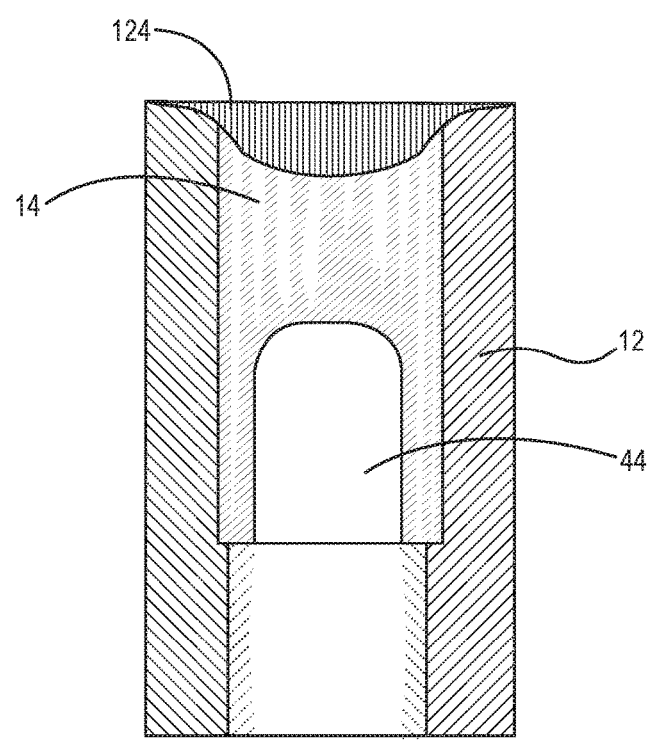

FIGS. 17A-17B are side views of the extruded member 12 and the plug 14 illustrating a friction stir weld process according to another embodiment. In this embodiment, a friction stir weld pin 122-1 (FIG. 17A) has a diameter 126 sufficient to engage the plug 14 and portions of the second end 18 of the extruded member 12 on either side of the plug 14 in a single pass. The friction stir weld pin 122-1 is moved linearly down a center line of the plug 14 and then removed, resulting in the formation of the friction stir weld 124 (FIG. 17B) between the plug 14 and the extruded member 12.

Figure 18:
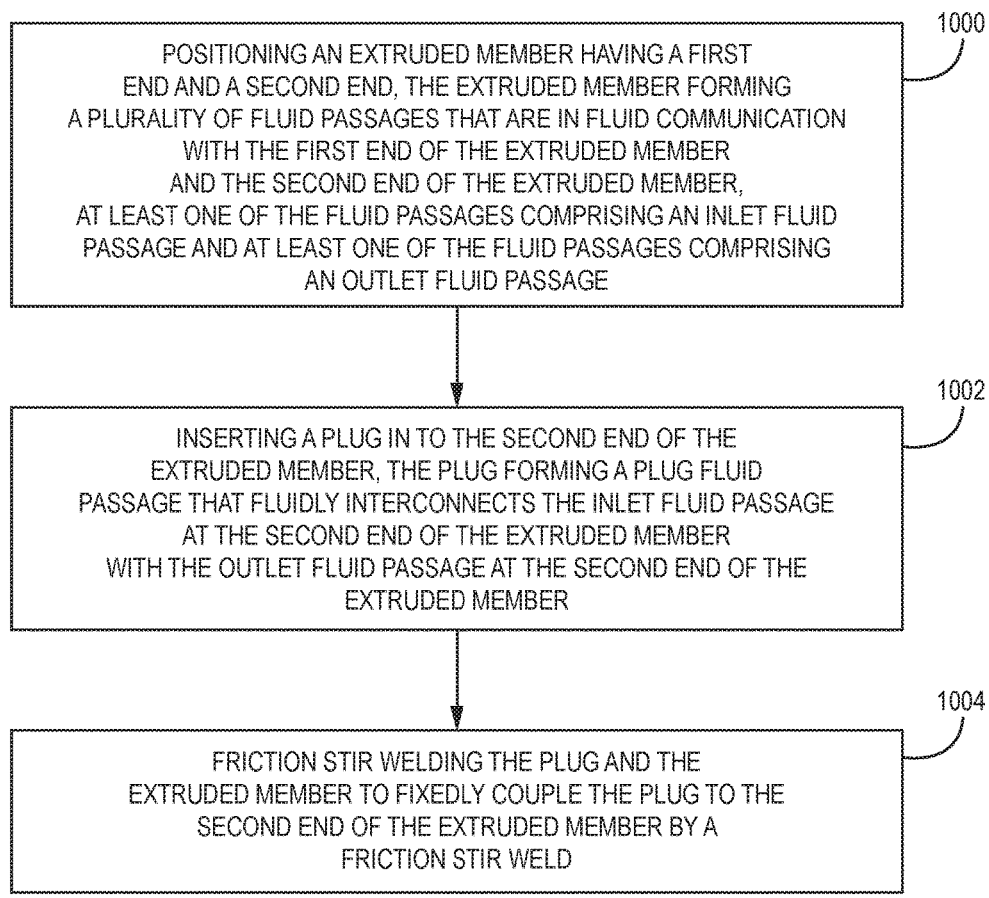
FIG. 18 illustrates a method for manufacturing a head exchange member according to one embodiment.

FIG. 18 is a method for manufacturing a heat exchange member 10 according to one embodiment. FIG. 18 will be discussed in conjunction with FIGS. 15-16C. Initially, the extruded member 12 is positioned (FIG. 18, block 1000). The positioning may be with respect to a table or other platform, or clamped in any desired configuration suitable for friction stir welding. The plug 14 is inserted into the second end 18 of the extruded member 12 (FIG. 18, block 1002). The plug 14 forms a plug fluid passage 44 that fluidically interconnects the inlet fluid passage 20a at the second end 18 of the extruded member 12 with the outlet fluid passages 20b at the second end 18 of the extruded member 12. The plug 14 and the extruded member 12 are friction stir welded to fixedly couple the plug 14 to the second end 18 of the extruded member 12 by the friction stir weld 124 (FIG. 18, block 1004). The use of FSW includes substantial advantages, such as no crevices and no dissimilar metals such that there is no galvanic corrosion.

The described heat exchanger constructions have a number of advantages. For example, in the case of seawater and other salt water environments, one of the biggest design factors for seawater heat exchangers is maintenance access and the ability to survive the harsh corrosion environment of seawater, for example, from crevice corrosion, pitting corrosion, and erosion corrosion. The open channel heat exchangers described herein eliminate a pressure vessel and one tube sheet from the construction. In addition, the one tube sheet that is used is disposed above the water surface so that it is not directly exposed to the corrosive effects of the water, thereby extending its life and permitting forms of attachment between the extruded members and the tube sheet that are less expensive than FSW. With a tube-tube sheet connection only at one end, there are no stresses due to thermal expansion/contraction of the extruded members as there would be for standard heat exchangers with tube sheets on each end and steel vessel/aluminum tubes. As a result of reduced stress, the connection at the single tube sheet to each extruded member can be much less robust and the extruded members could possibly be simply expanded or rolled into the tube sheet, instead of using FSW, further saving fabrication costs.

In addition, with water contact surfaces exposed on the outside of the extruded members, it is possible to readily coat the surfaces of the extruded members that will be exposed to water with anti-fouling and anti-corrosion agents. It is also possible to easily clean the outer surfaces to reduce bio-fouling and related pitting corrosion. The extruded members can also be arranged in such a way that all water contact surfaces can be seen for visual inspection and cleaning when the heat exchanger section is removed. The low cost of the tube sheet, removal of the pressure vessel, and simple manifolding can allow significantly smaller sub-sections of extruded members that are easier to assemble, remove/install, transport, and maintain.

Those skilled in the art will recognize improvements and modifications to the preferred embodiments of the disclosure. All such improvements and modifications are considered within the scope of the concepts disclosed herein and the claims that follow.

What is claimed is:

1. A heat exchanger comprising:
   a heat exchange member comprising:
      a first extruded member having a first end and a second end, the first extruded member having at least one internal wall formed within four exterior walls of the extruded member, the at least one internal wall defining a plurality of fluid passages that are in fluid communication with the first end of the first extruded member and the second end of the first extruded member, at least one of the fluid passages comprising an inlet fluid passage and at least one of the fluid passages comprising an outlet fluid passage; and
      a plug that is fixedly coupled to the second end of the first extruded member, the plug forming a plug fluid passage that fluidically interconnects the inlet fluid passage at the second end of the first extruded member with the outlet fluid passage at the second end of the first extruded member, the plug being in contact with an end of the at least one internal wall.

2. The heat exchanger of claim 1, wherein the plug is fixedly coupled to the first extruded member by a friction stir weld.

3. The heat exchanger of claim 2, wherein the plug and the first extruded member each comprise a same material.

4. The heat exchanger of claim 3, wherein the same material comprises aluminum.

5. The heat exchanger of claim 1, further comprising a turbulator disposed in the inlet fluid passage or in the outlet fluid passage.

6. The heat exchanger of claim 5, wherein the turbulator is integrated with the first extruded member.

7. The heat exchanger of claim 1, wherein the outlet fluid passage comprises a first outlet fluid passage and wherein the first extruded member further comprises a second outlet fluid passage, and wherein the plug fluid passage fluidically interconnects the inlet fluid passage at the second end of the first extruded member with the first outlet fluid passage at the second end of the first extruded member and the second outlet fluid passage at the second end of the first extruded member.

8. The heat exchanger of claim 1, further comprising:
   an inlet manifold fluidically connected to the first end of the first extruded member and in fluid communication with the inlet fluid passage at the first end of the first extruded member; and
   an outlet manifold fluidically connected to the first end of the first extruded member and in fluid communication with the outlet fluid passage at the first end of the first extruded member.

9. The heat exchanger of claim 8, further comprising a plurality of extruded members including the first extruded member, each extruded member having a first end and a second end and forming a plurality of fluid passages including an inlet fluid passage and an outlet fluid passage, and a plug that is fixedly coupled to the second end of the extruded member, the plug forming a plug fluid passage that fluidically interconnects the inlet fluid passage at the second end of the extruded member with the outlet fluid passage at the second end of the extruded member; and wherein:

the inlet manifold is fluidically connected to the first end of each of the plurality of extruded members and is in fluid communication with the inlet fluid passage of each of the plurality of extruded members; and the outlet manifold is fluidically connected to the first end of each of the plurality of extruded members and is in fluid communication with the outlet fluid passage of each of the plurality of extruded members.

10. The heat exchanger of claim 9, further comprising a plurality of spacer fins positioned between at least two extruded members of the plurality of extruded members, the plurality of spacer fins coupled to external surfaces of the at least two extruded members to form a plurality of external fluid passages between the at least two extruded members, the plurality of spacer fins comprising a thermally conductive material configured to conduct heat.

11. The heat exchanger of claim 10, wherein the plurality of spacer fins comprises a non-linear shape.

12. The heat exchanger of claim 9, wherein the plurality of spacer fins is an extruded feature of one of the at least two extruded members of the plurality of extruded members.

13. The heat exchanger of claim 9, wherein the first extruded member comprises an exterior machined surface, the exterior machined surface comprising a plurality of spacer fins configured to be bonded to an adjacent exterior surface of a second extruded member, the plurality of spacer fins forming a plurality of external fluid passages between the first extruded member and the second extruded member, the plurality of spacer fins comprising a thermally conductive material configured to conduct heat.

14. The heat exchanger of claim 1, wherein the at least one internal wall has a wall length less than a length of the first extruded member, and extending longitudinally from the first end of the first extruded member into the first extruded member.

15. The heat exchanger of claim 1, wherein a distance between the end of the at least one internal wall and the second end of the first extruded member is a same length as a height of the plug.

16. The heat exchanger of claim 1, wherein the first extruded member forms a fluid chamber that is fluidically coupled to each of the plurality of fluid passages at the second end of the first extruded member.

17. A method of manufacturing a heat exchange member comprising:

positioning an extruded member having a first end and a second end, the extruded member including at least one internal wall formed within four exterior walls of the extruded member, the at least one internal wall defining a plurality of fluid passages that are in fluid communication with the first end of the extruded member and the second end of the extruded member, at least one of the fluid passages comprising an inlet fluid passage and at least one of the fluid passages comprising an outlet fluid passage; and inserting a plug into the second end of the extruded member, the plug forming a plug fluid passage that fluidically interconnects the inlet fluid passage at the second end of the extruded member with the outlet fluid passage at the second end of the extruded member, the plug being in contact with an end of the at least one internal wall; and friction stir welding the plug and the extruded member to fixedly couple the plug to the second end of the extruded member by a friction stir weld.

18. The method of manufacturing the heat exchange member of claim 17, wherein friction stir welding the plug and the extruded member to fixedly couple the plug to the second end of the extruded member by the friction stir weld further comprises:

rotating a friction stir weld pin;

inserting the friction stir weld pin into the second end of the extruded member at an interface between the second end of the extruded member and the plug;

moving the friction stir weld pin completely about the joint; and removing the friction stir weld pin from the interface.

19. The method of manufacturing the heat exchange member of claim 17, wherein friction stir welding the plug and the extruded member to fixedly couple the plug to the second end of the extruded member by the friction stir weld further comprises:

rotating a friction stir weld pin;

inserting the friction stir weld pin into the second end of the extruded member at an interface between the second end of the extruded member and the plug;

moving the friction stir weld pin linearly along a center line of the plug; and removing the friction stir weld pin.

20. The heat exchanger of claim 1 wherein the plug forms a longitudinal groove that facilitates fluid exchange between the plurality of fluid passages.

21. A heat exchanger comprising:

a heat exchange member comprising:

a first extruded member having a first end and a second end, the first extruded member having at least one internal wall formed within four exterior walls of the extruded member, the at least one internal wall defining a plurality of fluid passages that are in fluid communication with the first end of the first extruded member and the second end of the first extruded member, at least one of the fluid passages comprising an inlet fluid passage and at least one of the fluid passages comprising an outlet fluid passage; and a plug that is fixedly coupled to the second end of the first extruded member, the plug forming a plug fluid passage that fluidically interconnects the inlet fluid passage at the second end of the first extruded member with the outlet fluid passage at the second end of the first extruded member;

wherein a distance between an end of the at least one internal wall and the second end of the first extruded member is a same length as a height of the plug and wherein the plug is in contact with the end of the at least one internal wall.

\* \* \* \* \*